United States Patent [19]
Land et al.

[11] Patent Number: 5,369,209
[45] Date of Patent: Nov. 29, 1994

[54] AMORPHOUS POLYESTERIMIDES WHICH CAN BE PROCESSED AS THERMOPLASTICS

[75] Inventors: Horst-Tore Land, Frankfurt am Main; Michaela Gedan, Sohland/Spr.; Manfred Rätzsch, Dresden; Frank Böhme, Dresden, all of Germany

[73] Assignee: Hoechst Aktiengesellschaft, Frankfurt am Main, Germany

[21] Appl. No.: 101,186

[22] Filed: Aug. 3, 1993

[30] Foreign Application Priority Data

Aug. 5, 1992 [DE] Germany .............. 4225865

[51] Int. Cl.$^5$ ............................. C08G 73/00
[52] U.S. Cl. .................. 528/170; 524/589; 528/184; 528/193; 528/322
[58] Field of Search ............ 528/170, 184, 193, 322; 524/589; 428/473.5

[56] References Cited

U.S. PATENT DOCUMENTS

| 4,948,863 | 8/1990 | Dicke et al. | 528/170 |
| 4,954,606 | 4/1990 | Dicke et al. | 528/170 |
| 5,147,962 | 9/1992 | Tanisake et al. | 528/170 |

FOREIGN PATENT DOCUMENTS

| 0314986 | 5/1989 | European Pat. Off. |
| 0347548 | 12/1989 | European Pat. Off. |

OTHER PUBLICATIONS

Chemical Abstract No. 19201V, "Polyesterimides", published Jan. 26, 1987.
Japanese Abstract No. 02-102-227 published Arp. 13, 1990.
Derwent Abstract No. 62-290-752 published Dec. 17, 1987.

*Primary Examiner*—John Kight, III
*Assistant Examiner*—Terressa M. Mosley
*Attorney, Agent, or Firm*—Curtis, Morris & Safford

[57] ABSTRACT

The invention relates to amorphous polyesterimides which comprises 50 to 100 mole-% of units of formula II

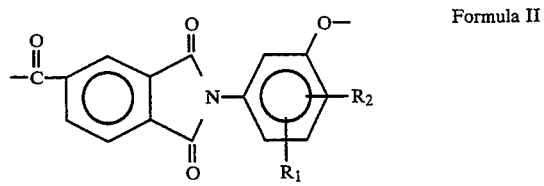

Formula II and from 0 to 50 mole-% of units of formula

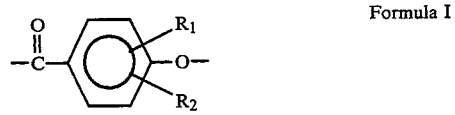

Formula I in which units
$R_1$ and $R_2$, independently of one another, are H, branched or unbranched alkyl radicals having 1 to 6 carbon atoms, branched or unbranched alkoxy radicals having 1 to 6 carbon atoms, or F, Cl or Br.

The polyesterimides according to the invention are suitable for the production of molding compositions, moldings, fibers and films.

9 Claims, No Drawings

AMORPHOUS POLYESTERIMIDES WHICH CAN BE PROCESSED AS THERMOPLASTICS

The invention relates to amorphous polyesterimides which can be processed as thermoplastics, based on N-(3-hydroxyphenyl)trimellitimide, to a process for their preparation, and to their use for the production of moldings, fibers, films and coating materials and for the preparation of reinforced or filled molding compositions.

Amorphous high-performance polymers are taken to mean polymeric glasses which have a glass transition temperature of above 150° C. These materials are used widely in the production of moldings, films and fibers, in particular due to their transparency and due to their excellent mechanical properties in combination with their good processing properties and high heat distortion resistance. Thus, for example, insulating sheets, control keys, viewing screens, lamp covers, snap-on connections, moldings for microwave ovens, headlamp reflectors, sterilizable medical equipment and moldings for electrical tools are produced from amorphous high-performance polymers.

The amorphous high-performance polymers used hitherto are predominantly polyarylates, polyester carbonates, polyether sulfones, polysulfones, polyetherimides and modified polycarbonates (D. Freitag, G. Fengler, L. Morbitzer; Angew. Chem., 103, 1626 (1991)).

The use of polyesterimides in the form of amorphous high-performance polymers has attracted little attention to date, since it has been impossible to determine a suitable composition for these materials which results in a polymer having a glass transition temperature of above 200° C., is still processable as a thermoplastic at temperatures up to 380° C. and also has, as a molding, advantageous properties such as transparency and good impact strength.

Polyesterimides have already been investigated as liquid-crystalline polymers. Thus, DE 3 814 974 A1 claims themotropic polyesterimides which, in addition to units of N-(3-hydroxyphenyl)trimellitimide and p-hydroxybenzoic acid, additionally contain aromatic dihydroxy- and dicarboxylic acid units. However, the liquid-crystalline character of these polymers results in anisotropy of the material properties, which is undesired in the areas in which high-performance polymers are employed. Also disadvantageous here are the properties typical of liquid-crystalline polymers, such as, for example, inadequate elongation at break and poor transparency (H. Domininghaus; "Die Kunstoffe und ihre Eigenschaften" [Plastics and Their Properties], p. 537, VDI-Verlag Dusseldorf (1988)).

The object of the invention was to provide amorphous polyesterimides which can be processed as thermoplastics. In particular, it should be possible for them to be processed as thermoplastics at temperatures up to 380° C., and their glass transition temperature should be above 200° C. Even as moldings, they should have good mechanical and optical properties.

This object is achieved according to the invention by amorphous polyesterimides which comprise the recurring units I and II:

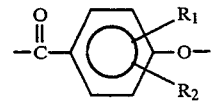
Unit I

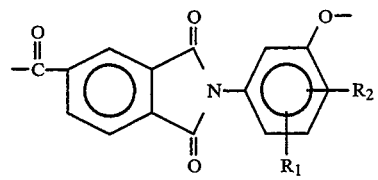
Unit II where unit I is derived from p-hydroxybenzoic acid, and unit II is derived from N-(3-hydroxyphenyl)trimellitimide, and in which $R_1$ and $R_2$, independently of one another, may be H, branched or unbranched alkyl radicals having 1 to 6 carbon atoms, branched or unbranched alkoxy radicals having 1 to 6 carbon atoms, or F, Cl or Br, and the units of the formula II are present in an amount of at least 50 mol %, based on the total amount of units.

The essential feature of the polyesterimides according to the invention is the high proportion of N-(3-hydroxyphenyl)trimellitimide units II in the overall composition. This proportion is preferably at least 50 mol % and can be up to 100 mol %, but is in particular from 60 to 100 mol %.

The recurring units I and II may be randomly distributed or in the form of blocks.

The polyesterimides according to the invention can be prepared by various processes, for example by condensation or transesterification of hydroxycarboxylic acids derived from the units I and II, or their reactive derivatives, and subsequent polycondensation (Y. Imai, M.A. Kakimoto; "Synthesis and Characterization of Aromatic Polyesters" in "Handbook of Polymer Science and Technology", p. 177 ff., Marcel Dekker Inc., New York (1989)).

Unit I is obtainable from p-hydroxybenzoic acid or from reactive derivatives thereof, such as the aryl or acyl esters. Preferred reactive derivatives which may be mentioned are phenyl esters, tolyl esters and the propionates. Particular preference is given to the acetates. The preparation of substituted p-hydroxybenzoic acid derivatives is described, inter alia, in R. Stern, Dissertation, University of Mainz, 1988.

Unit II is prepared from N-(3-hydroxyphenyl)trimellitimide or reactive derivatives thereof, such as the aryl or acyl esters.

N-(3-hydroxyphenyl)trimellitimide can be prepared from m-aminophenol and trimellitic anhydride by methods known from the literature (cf., for example, K. Kurita, S. Matsuda; Macromol. Chem. 194, 1223 (1983)).

Examples of preferred processes for the synthesis of the polyesterimides according to the invention are the reaction of lower acyl esters of hydroxycarboxylic acids derived from the units I and II, it also being possible for the lower acyl esters to be prepared in situ, and the reaction of aryl esters of hydroxycarboxylic acids derived from the formulae I and II. These reactions can be carried out either in the melt or in the presence of a solvent, for example chlorinated aromatic compounds.

Preference is given to the synthesis of polyesterimides in a melt.

Terminal groups which may be present in the polyesterimides according to the invention are —COOH, —H, —OH and/or acyloxy radicals. The terminal groups may also be formed from monofunctional molecular weight regulators. Preferred molecular weight regulators are 4-hydroxybiphenyl, 2-hydroxynaphthalene, tert-butylphenol or aromatic monocarboxylic acids, such as benzoic acid or 4-biphenylcarboxylic acid. These molecular weight regulators are preferably employed in amounts of from 0.01 to 5 mol %, based on the total amount of the monomers.

The condensation and transesterification reactions, like the polyermization reaction, can be accelerated by employing suitable catalysts. Such catalysts are Lewis acids, such as, for example, magnesium, titanium tetraisopropoxide, magnesium acetate, potassium acetate, cobalt acetate, alkoxytitanates, dibutyltin dilaurate or germanium dioxide. The catalysts are preferably employed in amounts of from 0.001 to 2%, based on the total weight of the starting compounds.

It is possible to carry out the preparation of the polyesterimides according to the invention at temperatures between 180° and 350° C.

In general, it is advantageous to accelerate the polymerization reaction by applying a vacuum. The reduced pressure employed can be applied at temperatures above 220° C. It is usually from 100 to 10,000 Pa.

The polyesterimides according to the invention are amorphous polymers which have a glass transition temperature of above 150° C., preferably above 200° C. As polymeric glasses, they are distinguished by high transparency and good mechanical properties, such as, for example, high impact strength and high elongation at break. Due to the surprisingly low melt viscosity of the polyesterimides according to the invention at 350° C. of less than 2000 Pa.s preferably less than 1000 Pa.s, these amorphous polymers can particularly favorably be converted into moldings, fibers and films from the melt. Since the polyesterimides according to the invention do not exhibit liquid-crystalline behavior, the material properties of the injection moldings are not anisotropic.

Polyesterimides according to the invention can also be used—either in powder form or dispersed in a solvent—as a coating material. They are also very highly suitable for the preparation of reinforced and/or filled molding compositions containing from 3 to 65%, based on the total weight of reinforced and/or filled molding composition, of reinforcing agent or filler. Examples of suitable fillers are carbon black, calcium carbonate, chalk, quartz powder, glass fibers and beads, talc, mica, kaolin, wollastonite, sawdust, heavy-metal powders or barium ferrite.

The invention is described in greater detail by means of the examples below.

EXAMPLES

The determination of the glass transition temperatures $T_g$ of the polymers was carried out using a DSC-7 differential calorimeter from Perkin Elmer (Überlingen, Germany) at a heating rate of 10° C./min.

The inherent viscosity $\eta_{inh}$ is a measure of the mean chain length of resultant polymers. $\eta_{inh}$ is taken to mean the term $$\lim_{C_2 \to 0} \frac{\eta_{sp}}{C_2}$$

where
$C_2$ = concentration of dissolved substance, $\eta_{sp}$ = specific viscosity $$\eta_{sp} = \frac{\eta}{\eta_1} - 1$$

$\eta$ = viscosity of the solution,
$\eta$ = viscosity of the pure solvent.

The inherent viscosities were determined by means of an Ubbelohde viscometer in p-chlorophenol at 45° C. at a concentration of 0.5 g of polymer in 100 ml of solvent.

The melt viscosity is a measure of the internal friction in the melt. It was measured using an RDS-300 rheometer (Rheometrics, Frankfurt, Germany) at a shear rate of 1000 rad/s and at 350° C.

The processing of the resultant polyesterimides by injection molding is carried out using an extruder (®Rheocord System 90/Rheomex 600, Haake, Karlsruhe, Germany) under a protective gas. The protective gas employed was argon.

The standard tensile test pieces obtained by injection molding were tested for their mechanical properties.

Using a ®Instron 4302 tensile tester (Instron, Offenbach, Germany), the tear strength, i.e. the tensile stress at which the test piece tears, and the elongation at break, i.e. the maximum elongation, were determined in accordance with DIN 53 371. The tensile modulus is calculated in accordance with DIN 53 457 from the initial slope of the tensile stress-elongation curve.

The notched impact strength is a measure of the resistance of a notched standard test piece against fracture on impact. In the Charpy test, carried out in accordance with DIN 53 453 (published by Deutsches Institut für Normung, "Kunstoffe, mechanische und thermische Eigenschaften" [Plastics, Mechanical and Thermal Properties], pp. 170 ff., Verlag Beuth, Berlin, Cologne (1988)), a standard test piece with defined notch is mounted at both ends and hit in the center with a pendulum. Notched impact strength was determined with the aid of an impact tester (Zwick, Nuremberg, Germany).

EXAMPLE 1

Preparation of N-(3-hydroxyphenyl)trimellitimide

The reaction is carried out in a 4 l flask fitted with reflux condenser, internal thermometer, protective-gas inlet, inlet pipe and stirrer blade. The stirrer blade is driven by a 2000 W stirrer, and the protective gas used is nitrogen. 95.38 g of m-aminophenol, 201.6 g trimellitic anhydride and 1600 g of 100% acetic acid are mixed with one another in a reactor prepared in this way, and the mixture is heated at 80° C. for three hours. The reaction mixture is subsequently refluxed for a further four hours. The cooled flask contents are poured into 6 l of ice-cold distilled water. The product which precipitates is filtered off, washed with 2 of hot water and with 1 l of ethanol, and subsequently dried at 100° C. for 48 hours in vacuo. The product is a pale yellowish, finely crystalline compound (yield 198.5 g=91% of theory).

Elemental analysis calculated C: 63.61 H: 3.20 N: 4.94
found C: 63.44 H: 3.43 N: 4.89

Preparation of N-(3-acetoxyphenyl)trimellitimide 95.93 g of N-(3-hydroxyphenyl)trimellitimide are mixed with 38.05 g of acetic anhydride, 200 ml of 100% acetic acid and 0.5 ml of 98% sulfuric acid in a 1 l flask fitted with reflux condenser, internal thermometer, precision glass stirrer and distillation attachment. The reaction mixture is refluxed for 3 hours, and the excess acetic acid is subsequently removed by distillation. The resultant residue is taken up in 200 ml of acetone, filtered off, washed with 500 ml of water and 300 ml of acetone and subsequently dried at 80° C. in vacuo. Drying leaves 66.51 g of a yellowish, finely crystalline product (yield=78% of theory).

Elemental analysis calculated C: 62.78 H: 3.41 N: 4.30 found C: 62.85 H: 3.38 N: 4.19

Preparation of polyesterimides 195.15 g (0.6 mol) of N-(3-acetoxyphenyl)trimellitimide are mixed with 72.06 g (0.4 mol) of p-acetoxybenzoic acid and 0.05 g of titanium tetraisopropoxide under an inert gas (nitrogen) in a 1 l glass flask fitted with inlet pipe and distillation attachment. The reaction mixture is heated to 230° C. over the course of 90 minutes, and the resultant melt is mixed vigorously by means of a ribbon stirrer. The melt is subsequently heated at 330° C. for a further 60 minutes and finally kept at 330° C. for a further 45 minutes under a vacuum of 100 Pa. When the reaction is complete, the mixture is cooled to room temperature, giving a glass-like, pale yellowish, transparent material which is removed mechanically from the flask.

The inherent viscosity of the material is $0.73 \times 10^{-1}$ l/g (measured in p-chlorophenol at 45° C.; c=5 g/l). The glass transition temperature ($T_g$) of the polymer is 219° C., and the melt viscosity is 750 Pa.s (sheer rate 1000 rad/s; 350° C.).

EXAMPLE 2 and 3

Further polyesterimides were prepared analogously to the reaction described in Example 1 from p-acetoxybenzoic acid and N-(3-acetoxyphenyl)trimellitimide. Compositions and properties of the products are shown in Table 1:

Table 1

Polyesterimides prepared from p-acetoxybenzoic acid (p-ABS) and N-(3-acetoxyphenyl)trimellitimide (3-APTI)

| Proportion of p-ABS (mol %) | Proportion of 3-APTI (mol %) | $\eta_{inh}$ ($10^{-1}$ l/g) | $T_g$ (°C.) | Melt viscosity (at 1000 rad/s, 350° C. in Pa.s) |
|---|---|---|---|---|
| 45 | 55 | 0.68 | 205 | 660 |
| 30 | 70 | 0.59 | 226 | 850 |

EXAMPLE 4

A standard tensile test piece was injection-molded at 350° C. from the polymer obtained in Example 1, and its mechanical properties were tested. The values determined are shown in Table 2. In addition, the glass transition temperature and the inherent viscosity are show:

Table 2

Physical properties of the polyesterimide prepared from 40 mol % of p-acetoxybenzoic acid and 60 mol % of N-(3-acetoxyphenyl)trimellitimide

| $\eta_{inh}$ ($10^{-1}$ l/g) | $T_g$ (°C.) | Tear strength (MPa) | Elongation at break (%) | Tensile modulus (GPa) | Notched impact strength Charpy) (kJ/m$^2$) |
|---|---|---|---|---|---|
| 0.73 | 219 | 81 | 35 | 2.3 | 25.1 |

We claim:

1. An amorphous polyesterimide comprising 50 to 100 mole-% of units of formula II

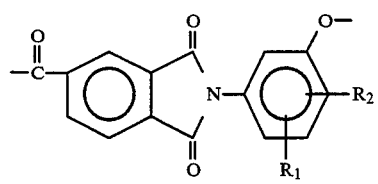

Formula II and from 0 to 50 mole-% of units of formula I

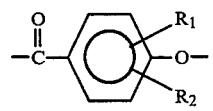

Formula I in which units

R$_1$ and R$_2$, independently of one another, are H, branched or unbranched alkyl radicals having 1 to 6 carbon atoms, branched or unbranched alkoxy radicals having 1 to 6 carbon atoms, or F, Cl or Br.

2. An amorphous polyesterimide as claimed in claim 1, wherein the units of the formula II are present in an amount of from 60 to 100 mol %.

3. An amorphous polyesterimide as claimed in claim 1, or 2, which has a glass transition temperature of above 150° C.

4. A process for the preparation of an amorphous polyesterimide as claimed in claim 1, which comprises linking the hydroxycarboxylic acids derived from the units of the formulae I and II, or their reactive derivatives, by a polycondensation reaction.

5. The process as claimed in claim 4 for the preparation of an amorphous polyesterimide, wherein the reactive starting materials for the polyesterimide containing the units of the formulae I and II are aryl or acyl esters.

6. A molding composition based on a polyesterimide as claimed in claim 1, which additionally contains from 3 to 65% of a reinforcing agent or filler, based on the total weight of the molding composition.

7. A molding composition as claimed in claim 6, wherein the reinforcing agents or fillers used are calcium carbonate, quartz powder, glass fibers, glass beads, chalk, talc, mica, kaolin, wollastonite, sawdust, heavy-metal powders, barium ferrite or carbon black.

8. A method of using a molding composition as claimed in claim 6 for the production of moldings, fibers or films.

9. An amorphous polyesterimide as claimed in claim 3, wherein the glass transition temperature is above 200° C.

* * * * *